(12) United States Patent
Gu et al.

(10) Patent No.: US 11,706,510 B2
(45) Date of Patent: *Jul. 18, 2023

(54) CAMERA MODULE

(71) Applicant: SAMSUNG ELECTRO-MECHANICS CO., LTD., Suwon-si (KR)

(72) Inventors: Won Seo Gu, Suwon-si (KR); Soo Gil Sin, Suwon-si (KR); Sang Jin Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/567,646

(22) Filed: Jan. 3, 2022

(65) Prior Publication Data

US 2022/0132005 A1   Apr. 28, 2022

Related U.S. Application Data

(63) Continuation of application No. 16/750,344, filed on Jan. 23, 2020, now Pat. No. 11,252,311.

(30) Foreign Application Priority Data

May 20, 2019   (KR) .......................... 10-2019-0058814

(51) Int. Cl.
   *H04N 23/54*   (2023.01)
   *H04N 23/55*   (2023.01)
(52) U.S. Cl.
   CPC ............. *H04N 23/54* (2023.01); *H04N 23/55* (2023.01)

(58) Field of Classification Search
   CPC .. H04N 5/2253; H04N 5/2254; H04N 5/2251; H05K 1/115; H05K 3/321
   See application file for complete search history.

(56) References Cited

U.S. PATENT DOCUMENTS 11,252,311 B2 * 2/2022 Gu ...................... H04N 5/2254
2006/0082658 A1   4/2006 Lee et al.
(Continued)

FOREIGN PATENT DOCUMENTS

CN   1763625 A   4/2006
CN   101064779 A   10/2007
(Continued)

OTHER PUBLICATIONS

Korean Office Action dated Apr. 6, 2020 in counterpart Korean Patent Application No. 10-2019-0058814 (8 pages in English and 5 pages in Korean).
(Continued)

*Primary Examiner* — Nhan T Tran
(74) *Attorney, Agent, or Firm* — NSIP Law

(57) ABSTRACT

A camera module includes a lens; an image sensor disposed on a substrate and converting an optical signal refracted by the lens into an electrical signal, an adhesive member disposed between the substrate and the image sensor to fix the image sensor to the substrate, and a support member disposed between the substrate and the image sensor configured to maintain a constant distance between the lens and the image sensor even at a time of shrinkage-deformation of the adhesive member.

18 Claims, 9 Drawing Sheets

(56) References Cited

U.S. PATENT DOCUMENTS

| | | | | |
|---|---|---|---|---|
| 2012/0211852 | A1* | 8/2012 | Iwafuchi | H01L 27/14685 257/435 |
| 2013/0271649 | A1* | 10/2013 | Halliday | H04N 5/2254 348/374 |
| 2014/0138551 | A1 | 5/2014 | Reboni et al. | |
| 2014/0374870 | A1* | 12/2014 | Lee | H01L 27/14687 257/466 |
| 2016/0116701 | A1* | 4/2016 | Yamada | G02B 27/0006 348/374 |
| 2016/0141235 | A1 | 5/2016 | Lin et al. | |
| 2017/0012142 | A1* | 1/2017 | Lin | G06V 40/1329 |
| 2017/0154913 | A1* | 6/2017 | Jun | H01L 27/14634 |
| 2019/0202136 | A1* | 7/2019 | Gaines | H05K 3/321 |
| 2021/0050377 | A1* | 2/2021 | Kim | H01L 27/14603 |

FOREIGN PATENT DOCUMENTS

| | | |
|---|---|---|
| CN | 103839954 A | 6/2014 |
| CN | 104333679 A | 2/2015 |
| CN | 105405771 A | 3/2016 |
| CN | 106803870 A | 6/2017 |
| CN | 109618080 A | 4/2019 |
| KR | 20-2009-0004352 U | 5/2009 |
| KR | 10-2011-0024854 A | 3/2011 |
| KR | 10-2014-0147410 A | 12/2014 |
| KR | 10-2015-0025831 A | 3/2015 |
| KR | 10-2017-0037459 A | 4/2017 |
| TW | I639880 B | 11/2018 |

OTHER PUBLICATIONS

Chinese Office Action dated Jun. 3, 2021 in Counterpart Chinese Patent Application No. 202010316434.8 (7 pages in English and 8 pages in Chinese).

* cited by examiner

CAMERA MODULE

CROSS-REFERENCE TO RELATED APPLICATIONS

This application is a continuation of U.S. patent application Ser. No. 16/750,344 filed on Jan. 23, 2020, now U.S. Pat. No. 11,252,311 issued on Feb. 15, 2022, which claims the benefit under 35 USC 119(a) of Korean Patent Application No. 10-2019-0058814 filed on May 20, 2019, in the Korean Intellectual Property Office, the entire disclosure of which is incorporated herein by reference for all purposes.

BACKGROUND

1. Field

The present disclosure relates to a camera module.

2. Description of the Background

A camera module may include an optical imaging system including one or more lenses and an image sensor. The optical imaging system may include one or more lenses having refractive power, and may form an image of light reflected from a subject with the image sensor. The image sensor may convert an optical signal refracted by the optical imaging system into an electrical signal.

Optical performance of the camera module is affected by a distance from the optical imaging system to the image sensor. For example, when a distance from the rearmost lens (a lens closest to the image sensor) of the optical imaging system to the image sensor is different from an optical design value or a rear focal length of the optical imaging system, an accurate image of the subject is not formed on an imaging plane of the image sensor.

However, in a camera module, the image sensor may be fixed to a substrate using an adhesive, and a position of the image sensor may thus be changed in a process of curing the adhesive.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a lens, an image sensor disposed on a substrate and converting an optical signal refracted by the lens into an electrical signal, an adhesive member disposed between the substrate and the image sensor to fix the image sensor to the substrate, and a support member disposed between the substrate and the image sensor configured to maintain a constant distance between the lens and the image sensor even at a time of shrinkage-deformation of the adhesive member.

The support member may be disposed along a lower edge of the image sensor.

The adhesive member may be partially disposed in a diagonal direction of the image sensor.

The support member may have a bonding wire form.

The bonding wire may include a horizontal portion in line contact with a lower portion of the image sensor.

In another general aspect, a camera module includes a lens, a substrate having a groove, an image sensor disposed in the groove and converting an optical signal refracted by the lens into an electrical signal, an adhesive member fixing the image sensor to the groove, and a support member disposed in the groove configured to maintain a constant distance between the lens and the image sensor even at a time of shrinkage-deformation of the adhesive member.

The adhesive member may be disposed between inner surfaces of the groove and side surfaces of the image sensor.

The substrate may include a first substrate member in which a through-hole corresponding to the groove is formed, and a second substrate member coupled to the first substrate member and closing a lower portion of the through-hole.

In another general aspect, a camera module includes a substrate, a support member disposed on the substrate, an image sensor disposed on the support member, and an adhesive member bonded to the substrate and the image sensor, wherein the adhesive member thickness in a direction from the substrate to the image sensor is predetermined by the image sensor disposed against the support member.

The camera module may further include a lens configured to refract light including an optical signal converted by the image sensor to an electrical signal.

The support member may be spaced apart from the adhesive member.

The image sensor may be disposed on a bottom surface of a groove in the substrate, and the adhesive member may be further disposed on a side surface of the image sensor between inner surfaces of the groove.

The adhesive member may urge the image sensor against the support member.

The support member may include a plastically deformed portion to align the image sensor and the lens by a predetermined distance.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
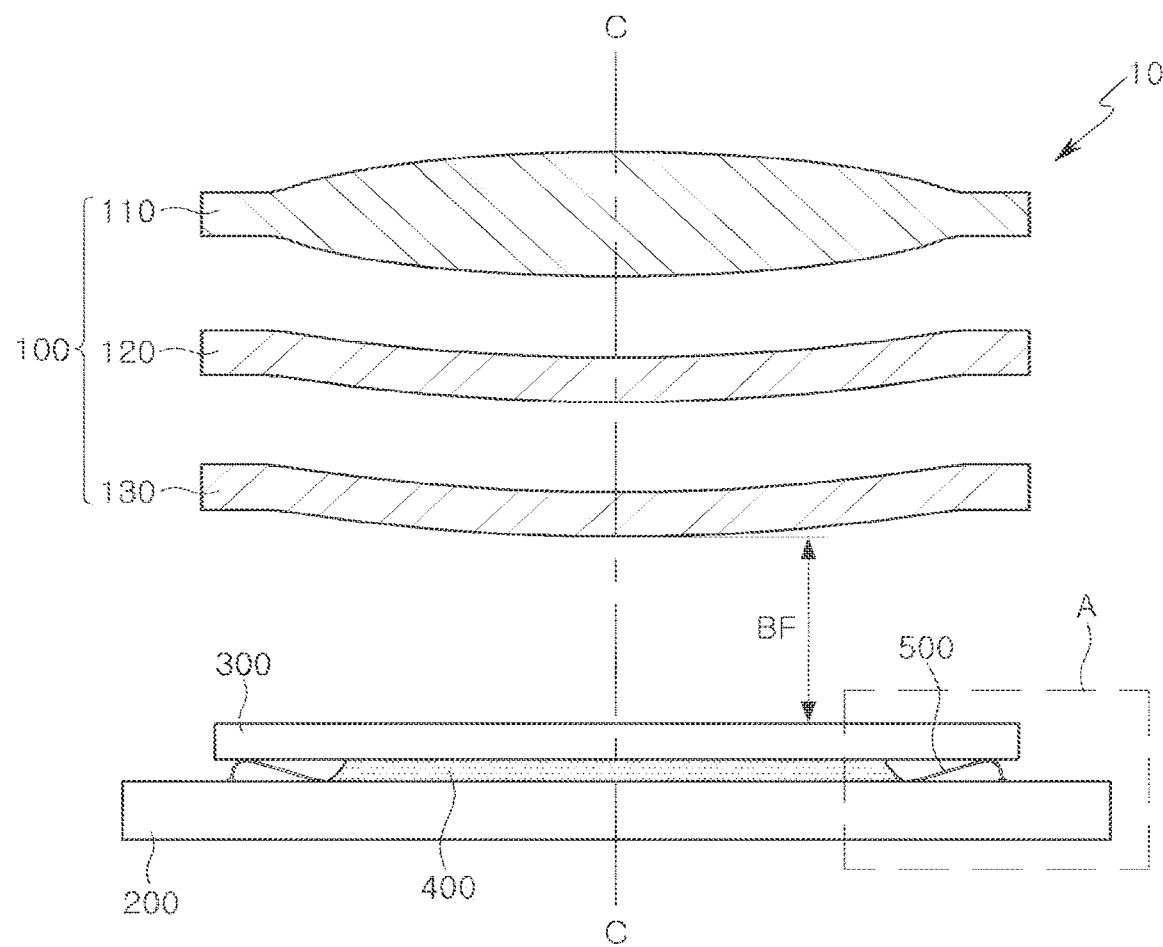
FIG. 1 is a cross-sectional view of a camera module according to one or more examples.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element, Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur, for example, during manufacturing.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

One or more examples of a camera module in which a distance from the rearmost lens of an optical imaging system to an image sensor is accurately maintained are described herein.

A camera module according to the present disclosure may be configured so that a distance between a lens and an image sensor is constantly maintained. For example, the camera module according to the present disclosure may include support members disposed between the image sensor and a substrate. The support members may constantly maintain a relative position of the image sensor to the lens even at a time of shrinkage-deformation of an adhesive applied to a lower portion of the image sensor.

The support member may be formed of a material that is easily plastically-deformed. For example, the support member may be formed of a material that is a metal and is easily deformed, such as a bonding wire. The support member formed as described above may enable adjustment of the relative position of the image sensor to the lens.

Hereinafter, various examples will be described with reference to the drawings.

Figure 2:
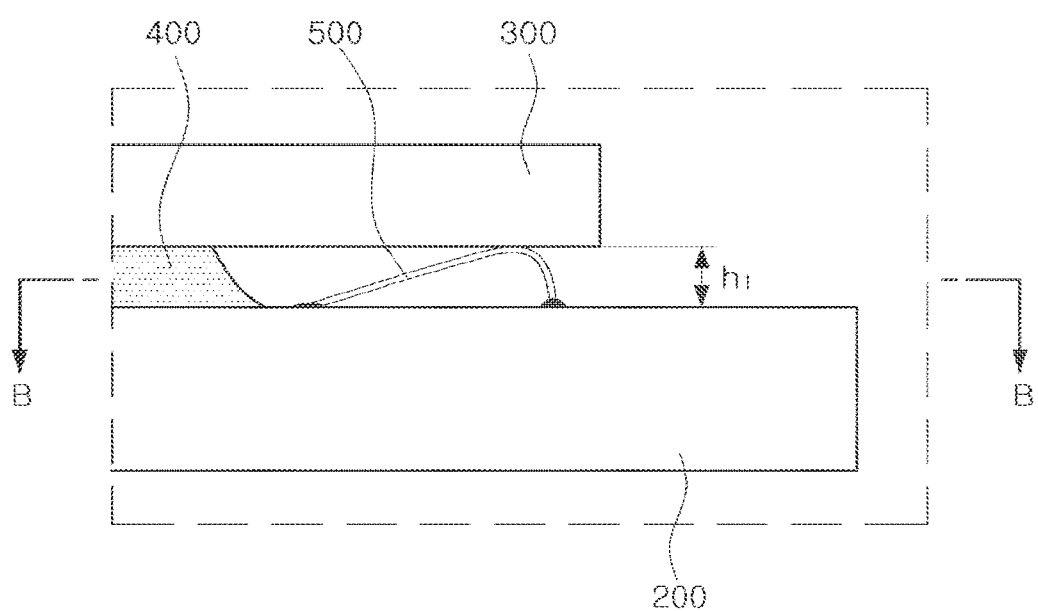
FIG. 2 is an enlarged view of part A illustrated in FIG. 1.

First, a camera module according to one or more examples will be described with reference to FIGS. 1 through 3.

A camera module 10 according to the present example may include an optical imaging system 100, a substrate 200, and an image sensor 300. In addition, the camera module 10 may further include an adhesive member 400 and support members 500.

The optical imaging system 100 may include one or more lenses. For example, the optical imaging system 100 according to the present example may include a first lens 110, a second lens 120, and a third lens 130. However, the number of lenses constituting the optical imaging system 100 is not limited to three. For example, the optical imaging system 100 may include two or less or four or more lenses. The optical imaging system 100 may have a focal length. For example, the optical imaging system 100 may have a predetermined back focal length (BF). The optical imaging system 100 may further include a filter (not illustrated) for cutting off an infrared ray. In this case, the filter may be disposed between the rearmost lens (the third lens 130 in the present example) and the image sensor 300.

The first lens 110 may have positive refractive power. An object-side surface of the first lens 110 may be convex, and an image-side surface thereof may be convex. The first lens 110 may have an aspherical surface. For example, at least one of the object-side surface and the image-side surface of the first lens 110 may be aspherical. The second lens 120 may have positive refractive power. An object-side surface of the second lens 120 may be concave, and an image-side surface thereof may be convex. The second lens 120 may have an aspherical surface. For example, at least one of the object-side surface and the image-side surface of the second lens 120 may be aspherical. The third lens 130 may have positive or negative refractive power. An object-side surface of the third lens 130 may be concave, and an image-side surface thereof may be convex. The third lens 130 may have an aspherical surface. For example, at least one of the object-side surface and the image-side surface of the third lens 130 may be aspherical.

One or more electronic components may be mounted on the substrate 200. For example, connection pads for electrical connection to the electronic components may be formed on the substrate 200. The substrate 200 may electrically connect the electronic components mounted thereon to each other. For example, circuits for connecting the connection pads to each other may be formed on the substrate 200. The circuits may be formed on a surface of and inside the substrate 200.

The image sensor 300 may be disposed on the substrate 200. For example, the image sensor 300 may be disposed above the substrate 200. The image sensor 300 may convert an optical signal refracted by the optical imaging system 100 into an electrical signal.

The adhesive member 400 may be formed between the substrate 200 and the image sensor 300. For example, the adhesive member 400 may be partially formed in a diagonal direction of the substrate 200 or the image sensor 300, as illustrated in FIG. 3. In addition, the adhesive member 400 may be formed from a central portion of the substrate 200 or the image sensor 300 along width and length directions of the substrate 200 or the image sensor 300. The adhesive member 400 formed as described above may be photo-cured or thermally cured to firmly fix the image sensor 300 to the substrate 200.

Figure 3:
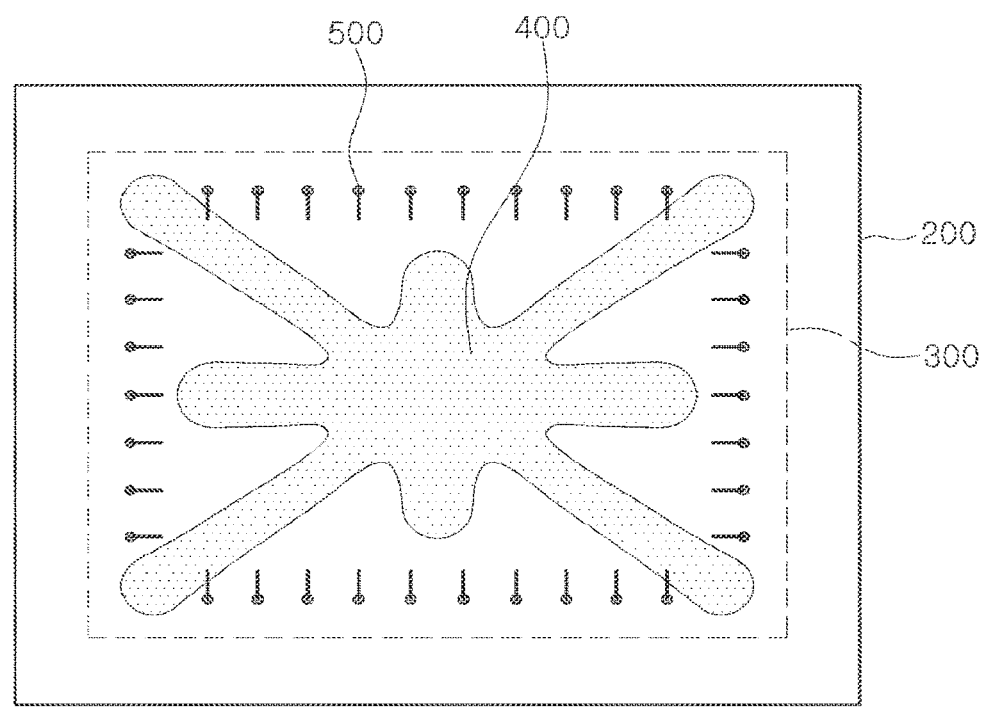
FIG. 3 is a cross-sectional view taken along line B-B of FIG. 2.

The support members 500 may be formed on the substrate 200, For example, the support members 500 may be formed at intervals along a lower edge of the image sensor 300 as illustrated in FIG. 3. The support member 500 may have a bonding wire form. The support members 500 formed as described above may be rapidly and easily formed in a wire bonding process of electrically connecting the substrate 200 and the electronic components to each other. The support members 500 may support the image sensor 300 at a first height h1. Here, the first height h1 may be in a range of approximately 110 to 140 μm. In addition, the support members 500 may be formed between the substrate 200 and the image sensor 300 to maintain a constant distance (that is, a back focal length BF) between the optical imaging system 100 and the image sensor 300. For example, the support members 500 may solve a phenomenon in which a distance between the substrate 200 and the image sensor 300 is decreased and the distance between the optical imaging system 100 and the image sensor 300 is increased due to shrinkage-curing of the adhesive member 400.

Therefore, in the camera module 10 according to the present example, quality deterioration phenomenon of the camera module 10 due to the shrinkage-curing of the adhesive member 400 may be significantly alleviated.

Figure 4:
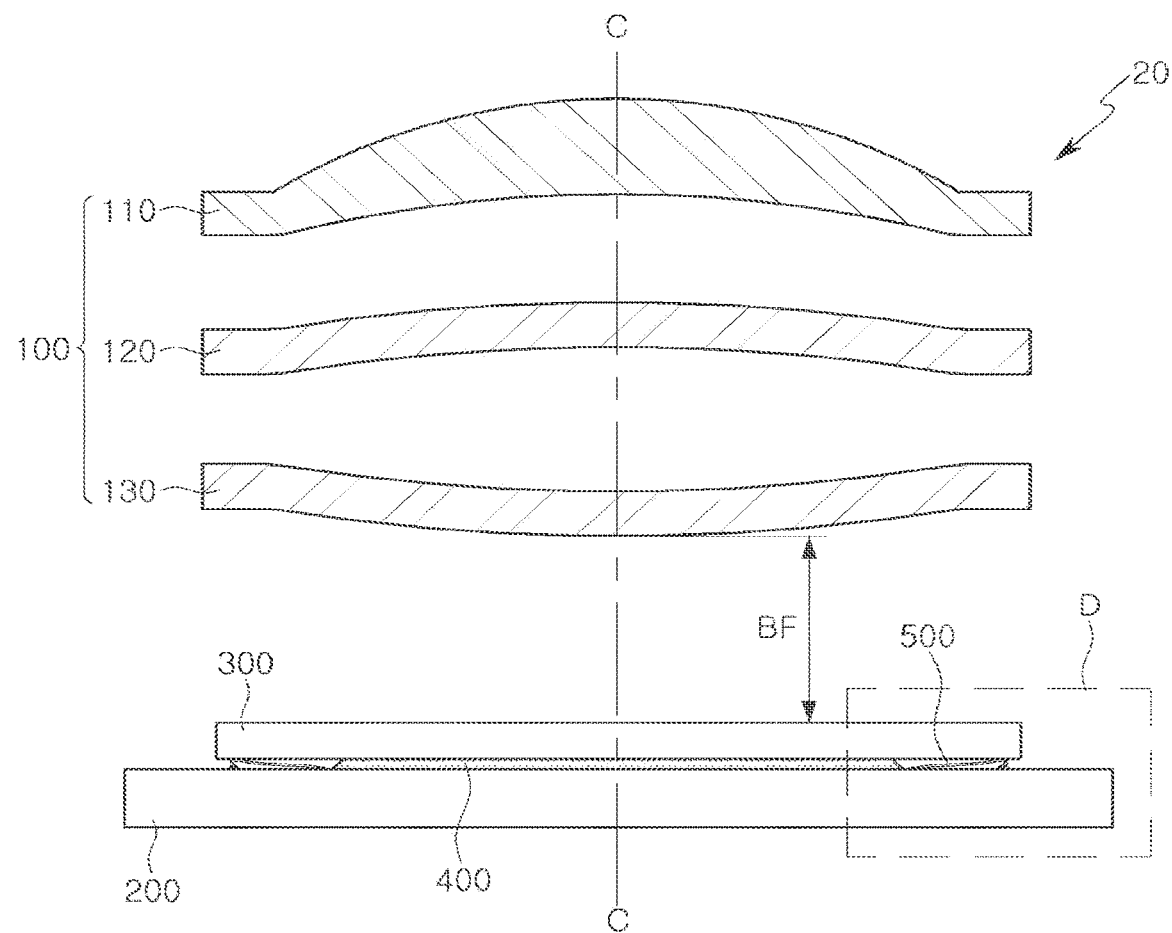
FIG. 4 is a cross-sectional view of a camera module according to one or more other examples.
Figure 5:
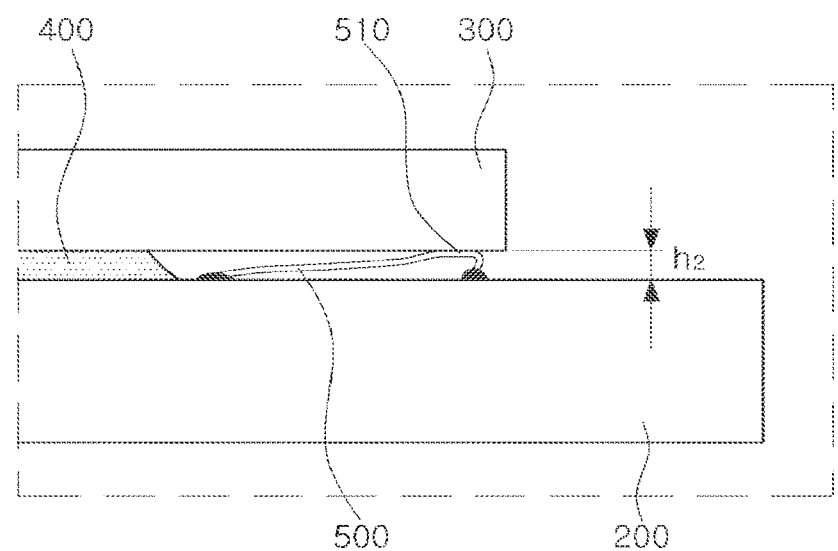
FIG. 5 is an enlarged view of part D illustrated in FIG. 4.

A camera module according to one or more other examples will be described with reference to FIGS. 4 and 5.

A camera module 20 according to the present example may include an optical imaging system 100, a substrate 200, and an image sensor 300. In addition, the camera module 20 may further include an adhesive member 400 and support members 500.

The optical imaging system 100 may include one or more lenses. For example, the optical imaging system 100 according to the present example may include a first lens 110, a second lens 120, and a third lens 130. The optical imaging system 100 may have a focal length. For example, the optical imaging system 100 may have a predetermined back focal length (BF).

The first lens 110 may have positive refractive power. An object-side surface of the first lens 110 may be convex, and an image-side surface thereof may be concave. The first lens 110 may have an aspherical surface. For example, at least one of the object-side surface and the image-side surface of the first lens 110 may be aspherical. The second lens 120 may have positive or negative refractive power. An object-side surface of the second lens 120 may be convex, and an image-side surface thereof may be concave. The second lens 120 may have an aspherical surface. For example, at least one of the object-side surface and the image-side surface of the second lens 120 may be aspherical. The third lens 130 may have positive or negative refractive power. An object-side surface of the third lens 130 may be concave, and an image-side surface thereof may be convex. The third lens 130 may have an aspherical surface. For example, at least one of the object-side surface and the image-side surface of the third lens 130 may be aspherical.

One or more electronic components may be mounted on the substrate 200. For example, connection pads for electrical connection to the electronic components may be formed on the substrate 200. The substrate 200 may electrically connect the electronic components mounted thereon to each other. For example, circuits for connecting the connection pads to each other may be formed on the substrate 200. The circuits may be formed on a surface of and inside the substrate 200.

The image sensor 300 may be disposed on the substrate 200. For example, the image sensor 300 may be disposed above the substrate 200. The image sensor 300 may convert an optical signal refracted by the optical imaging system 100 into an electrical signal.

The adhesive member 400 may be formed between the substrate 200 and the image sensor 300. For example, the adhesive member 400 may be partially formed in a diagonal direction of the substrate 200 or the image sensor 300, as illustrated in FIG. 3. In addition, the adhesive member 400 may be formed from a central portion of the substrate 200 or the image sensor 300 along width and length directions of the substrate 200 or the image sensor 300. The adhesive member 400 formed as described above may be photo-cured or thermally cured to firmly fix the image sensor 300 to the substrate 200.

The support members 500 may be formed on the substrate 200. For example, the support members 500 may be formed at intervals along a lower edge of the image sensor 300 or a diagonal length direction of the image sensor 300. The support member 500 may have a bonding wire form. The support members 500 formed as described above may be rapidly and easily formed in a wire bonding process of electrically connecting the substrate 200 and the electronic components to each other. In addition, the support member 500 according to the present example may be configured in a bonding wire form having a horizontal portion 510. As an example, the support member 500 having such a form may be formed by pressing a bonding wire having a curved shape with a predetermined force. As another example, a bonding wire having the horizontal portion 510 may be formed by pressing the image sensor 300 in a state in which the image sensor 300 is put on the support member 500. When the support member 500 is formed by the latter method, a distance decrease phenomenon between the optical imaging system 100 and the image sensor 300 due to excessive application of the adhesive member 400 may be solved. The horizontal portion 510 formed as described above may be in line contact with a lower portion of the image sensor 300 to firmly support the image sensor 300.

The support members 500 may support the image sensor 300 at a second height h2 that is significantly low. Here, the second height h2 may be in a range of approximately 50 to 70 μm. In addition, the support members 500 may be formed between the substrate 200 and the image sensor 300 to maintain a constant distance (that is, a back focal length BF) between the optical imaging system 100 and the image sensor 300. For example, the support members 500 may solve a phenomenon in which a distance between the substrate 200 and the image sensor 300 is decreased and the distance between the optical imaging system 100 and the image sensor 300 is increased due to shrinkage-curing of the adhesive member 400.

Therefore, in the camera module 20 according to the present example, quality deterioration phenomenon of the camera module 20 due to the shrinkage-curing of the adhesive member 400 and the excessive application of the adhesive member 400 may be significantly alleviated.

Figure 6:
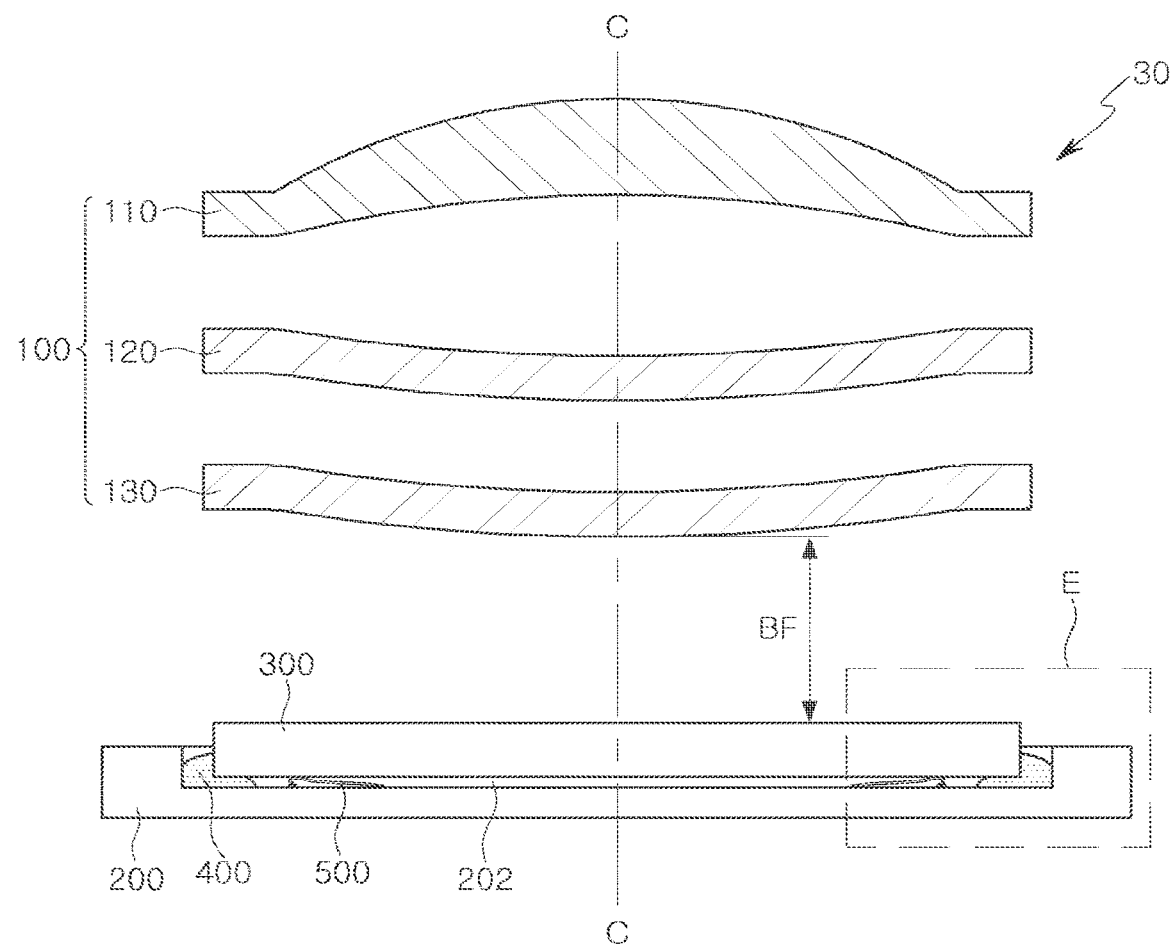
FIG. 6 is a cross-sectional view of a camera module according one or more still other examples.
Figure 7:
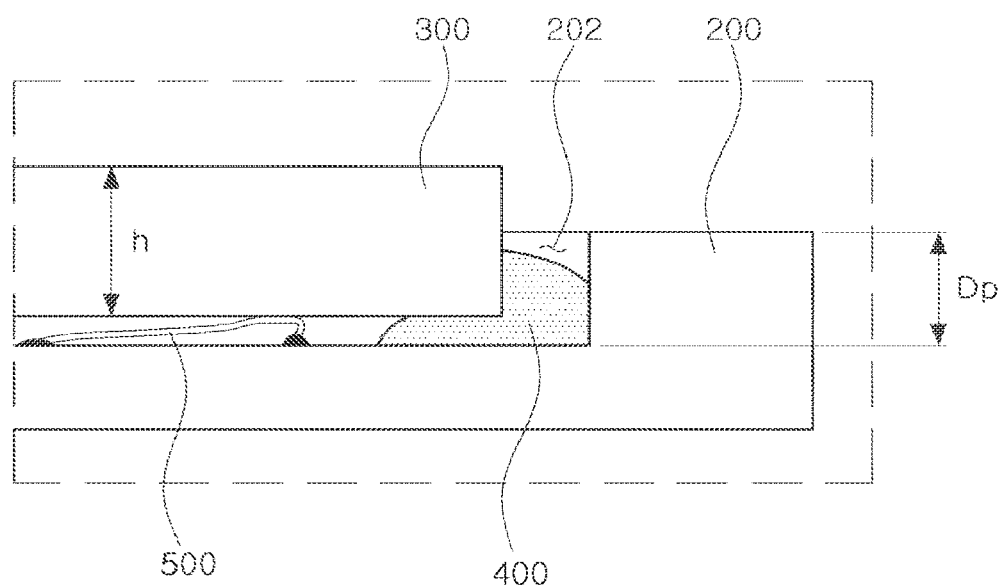
FIG. 7 is an enlarged view of part E illustrated in FIG. 6.

A camera module according to one or more other examples will be described with reference to FIGS. 6 and 7.

A camera module 30 according to the present example may include an optical imaging system 100, a substrate 200, and an image sensor 300. In addition, the camera module 30 may further include an adhesive member 400 and support members 500.

The optical imaging system 100 may include one or more lenses. For example, the optical imaging system 100 according to the present example may include a first lens 110, a second lens 120, and a third lens 130. The optical imaging system 100 may have a focal length. For example, the optical imaging system 100 may have a predetermined back focal length (BF).

The first lens 110 may have positive refractive power. An object-side surface of the first lens 110 may be convex, and an image-side surface thereof may be concave. The first lens 110 may have an aspherical surface. For example, at least one of the object-side surface and the image-side surface of the first lens 110 may be aspherical. The second lens 120 may have positive or negative refractive power. An object-side surface of the second lens 120 may be concave, and an image-side surface thereof may be convex. The second lens 120 may have an aspherical surface. For example, at least one of the object-side surface and the image-side surface of the second lens 120 may be aspherical. The third lens 130 may have positive or negative refractive power. An object-side surface of the third lens 130 may be concave, and an image-side surface thereof may be convex. The third lens 130 may have an aspherical surface. For example, at least one of the object-side surface and the image-side surface of the third lens 130 may be aspherical.

One or more electronic components may be mounted on the substrate 200. For example, connection pads for electrical connection to the electronic components may be formed on the substrate 200. The substrate 200 may electrically connect the electronic components mounted thereon to each other. For example, circuits for connecting the connection pads to each other may be formed on the substrate 200. The circuits may be formed on a surface of and inside the substrate 200. The substrate 200 may include a groove 202 accommodating the image sensor 300 therein. The groove 202 may be formed at a significant depth Dp. For example, the depth Dp of the groove 202 may be substantially the same as a height h of the image sensor 300. However, the depth Up of the groove 202 is not necessarily the same as the height h of the image sensor 300.

The image sensor 300 may be disposed in the groove 202 of the substrate 200. The image sensor 300 may convert an optical signal refracted by the optical imaging system 100 into an electrical signal.

The adhesive member 400 may be formed between the substrate 200 and the image sensor 300. For example, the adhesive member 400 may be formed between inner surfaces of the groove 202 and side surfaces of the image sensor 300, as illustrated in FIG. 7. However, a position of the adhesive member 400 is not limited to the portion described above. For example, the adhesive member 400 may be formed between a bottom surface of the groove 202 and a lower portion of the image sensor 300. The adhesive member 400 formed as described above may be photo-cured or thermally cured to firmly fix the image sensor 300 to the substrate 200.

The support members 500 may be formed on the substrate 200. For example, the support members 500 may be formed at intervals along a lower edge of the image sensor 300 or a diagonal length direction of the image sensor 300. The support member 500 may have a bonding wire form. The support members 500 formed as described above may be rapidly and easily formed in a wire bonding process of electrically connecting the substrate 200 and the electronic components to each other. In addition, the support member 500 according to the present example may be configured in a bonding wire form having a horizontal portion 510. As an example, the support member 500 having such a form may be formed by pressing a bonding wire having a curved shape with a predetermined force. As another example, a bonding wire having the horizontal portion 510 may be formed by pressing the image sensor 300 in a state in which the image sensor 300 is put on the support member 500. When the support member 500 is formed by the latter method, a distance decrease phenomenon between the optical imaging system 100 and the image sensor 300 due to excessive application of the adhesive member 400 may be solved. The horizontal portion 510 formed as described above may be in line contact with a lower portion of the image sensor 300 to firmly support the image sensor 300.

The support members 500 may support the image sensor 300 at a second height h2 that is significantly low. Here, the second height h2 may be in a range of approximately 50 to 70 μm. In addition, the support members 500 may be formed between the substrate 200 and the image sensor 300 to maintain a constant distance (that is, a back focal length BF) between the optical imaging system 100 and the image sensor 300. For example, the support members 500 may solve a phenomenon in which a distance between the substrate 200 and the image sensor 300 is decreased and the distance between the optical imaging system 100 and the image sensor 300 is increased due to shrinkage-curing of the adhesive member 400.

Therefore, in the camera module 30 according to the present example, quality deterioration phenomenon of the camera module 30 due to the shrinkage-curing of the adhesive member 400 and the excessive application of the adhesive member 400 may be significantly alleviated. In addition, in the camera module 30 according to the present example, the image sensor 300 may be disposed in the groove 202 of the substrate 200, such that an entire height of the camera module 30 may be decreased.

Figure 8:
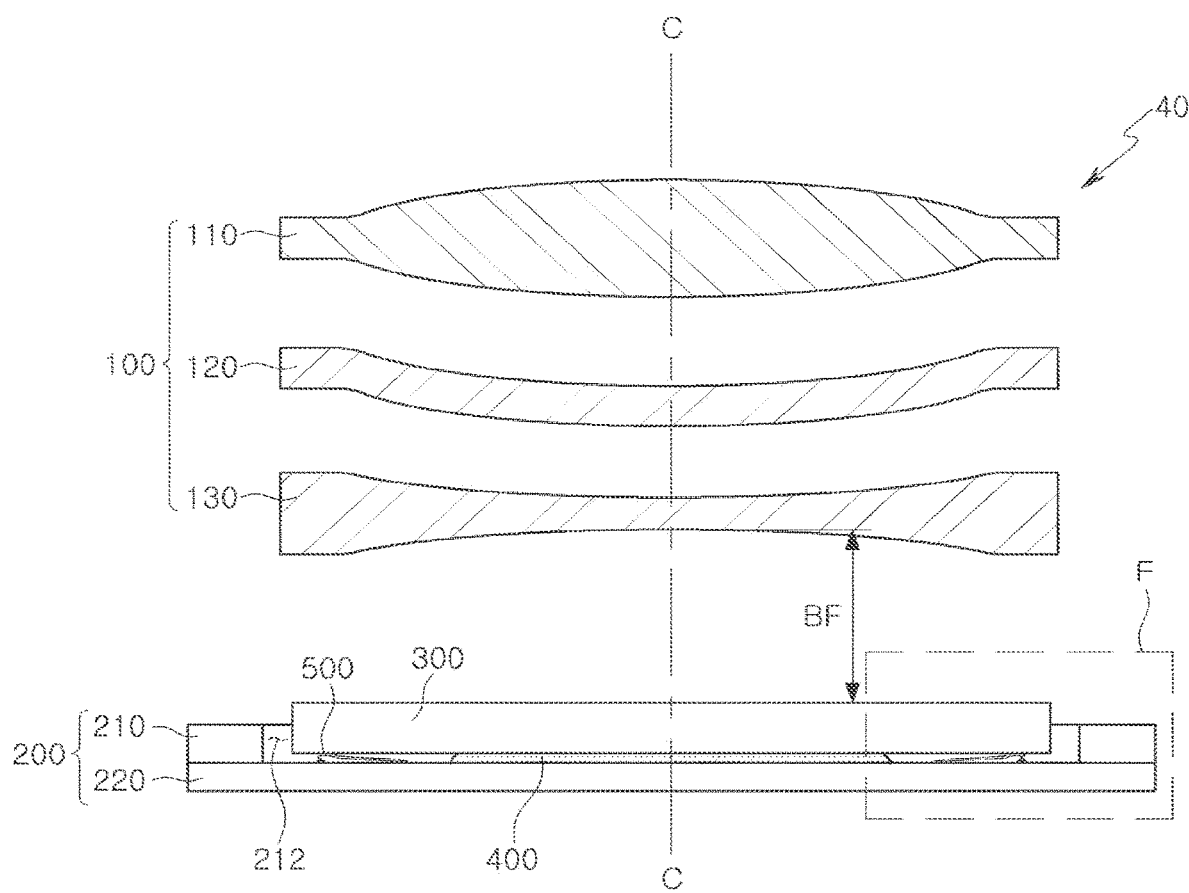
FIG. 8 is a cross-sectional view of a camera module according one or more still other examples.
Figure 9:
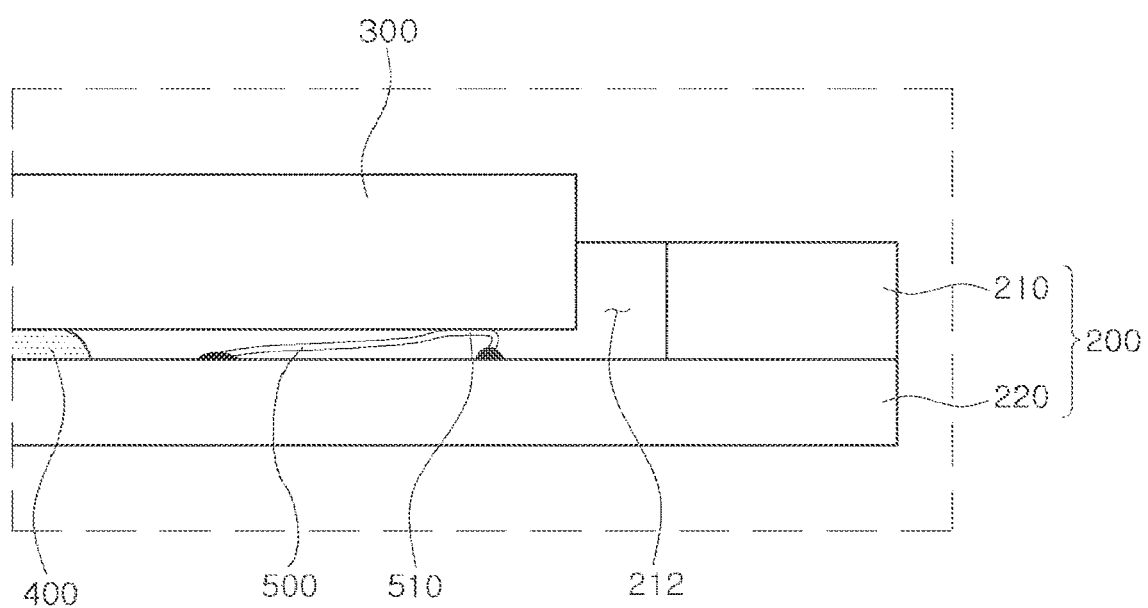
FIG. 9 is an enlarged view of part F illustrated in FIG. 8.

A camera module according to one or more other examples will be described with reference to FIGS. 8 and 9.

A camera module 40 according to the present example may include an optical imaging system 100, a substrate 200, and an image sensor 300. In addition, the camera module 40 may further include an adhesive member 400 and support members 500.

The optical imaging system 100 may include one or more lenses. For example, the optical imaging system 100 according to the present example may include a first lens 110, a second lens 120, and a third lens 130. The optical imaging system 100 may have a focal length. For example, the optical imaging system 100 may have a predetermined back focal length (BF).

The first lens 110 may have positive refractive power. An object-side surface of the first lens 110 may be convex, and an image-side surface thereof may be convex. The first lens 110 may have an aspherical surface. For example, at least one of the object-side surface and the image-side surface of the first lens 110 may be aspherical. The second lens 120 may have positive or negative refractive power. An object-side surface of the second lens 120 may be concave, and an image-side surface thereof may be convex. The second lens 120 may have an aspherical surface. For example, at least one of the object-side surface and the image-side surface of the second lens 120 may be aspherical. The third lens 130 may have positive or negative refractive power. An object-side surface of the third lens 130 may be concave, and an image-side surface thereof may be concave. The third lens 130 may have an aspherical surface. For example, at least one of the object-side surface and the image-side surface of the third lens 130 may be aspherical.

The substrate 200 may include a plurality of members. For example, the substrate 200 may include a first substrate member 210 and a second substrate member 220. A through-hole 212 in which the image sensor 300 may be disposed may be formed in the first substrate member 210. The through-hole 212 may have a shape substantially similar to that of the image sensor 300. For example, the through-hole 212 may have a substantially rectangular cross-sectional shape, similar to the image sensor 300. A cross section of the through-hole 212 may be substantially greater than that of the image sensor 300. A depth of the through-hole 212 may be substantially same as a height of the image sensor 300. However, the depth of the through-hole 212 is not necessarily the same as the height of the image sensor 300, The second substrate member 220 may be disposed beneath the first substrate member 210. The second substrate member 220 may be formed at a size that is substantially the same as that of the first substrate member 210, In addition, the second substrate member 220 may close the through-hole 212 of the first substrate member 210, The second substrate member 220 may be attached to a lower portion of the first substrate member 210 in a process of manufacturing the adhesive member 400 or the substrate 200.

The image sensor 300 may be disposed in the through-hole 212 of the first substrate member 210. The image sensor 300 may convert an optical signal refracted by the optical imaging system 100 into an electrical signal.

The adhesive member 400 may be formed between the substrate 200 and the image sensor 300. For example, the adhesive member 400 may be formed between the second substrate member 220 and the image sensor 300, as illustrated in FIG. 9. The adhesive member 400 formed as described above may be photo-cured or thermally cured to firmly fix the image sensor 300 to the substrate 200.

A portion of the one or more electronic components described above as mounted on the substrate 200 may be mounted on the second substrate member 220.

The support members 500 may be formed on the second substrate member 220. For example, the support members 500 may be formed at intervals along a lower edge of the image sensor 300 or a diagonal length direction of the image sensor 300. The support member 500 may have a bonding wire form. The support members 500 formed as described above may be rapidly and easily formed in a wire bonding process of electrically connecting the second substrate member 220 and the electronic components to each other. In addition, the support member 500 according to the present example may be configured in a bonding wire form having a horizontal portion 510. As an example, the support member 500 having such a form may be formed by pressing a bonding wire having a curved shape with a predetermined force. As another example, a bonding wire having the horizontal portion 510 may be formed by pressing the image sensor 300 in a state in which the image sensor 300 is put on the support member 500, When the support member 500 is formed by the latter method, a distance decrease phenomenon between the optical imaging system 100 and the image sensor 300 due to excessive application of the adhesive member 400 may be solved. The horizontal portion 510 formed as described above may be in line contact with a lower portion of the image sensor 300 to firmly support the image sensor 300.

The support members 500 may support the image sensor 300 at a second height h2 that is significantly low. Here, the second height h2 may be in a range of approximately 50 to 70 μm. In addition, the support members 500 may be formed between the substrate 200 and the image sensor 300 to maintain a constant distance (that is, a back focal length BF) between the optical imaging system 100 and the image sensor 300. For example, the support members 500 may solve a phenomenon in which a distance between the substrate 200 and the image sensor 300 is decreased and the distance between the optical imaging system 100 and the image sensor 300 is increased due to shrinkage-curing of the adhesive member 400.

Therefore, in the camera module 40 according to the present example, quality deterioration phenomenon of the camera module 40 due to the shrinkage-curing of the adhesive member 400 and the excessive application of the adhesive member 400 may be significantly alleviated. In addition, in the camera module 40 according to the example, the image sensor 300 may be disposed in the groove 212 of the first substrate member 210, such that an entire height of the camera module 40 may be decreased.

As set forth above, according to the one or more examples described herein, reliability for optical performance of a camera module may be improved.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of this disclosure is defined not by the detailed description, but by the claims and their equivalents, and all variations within the scope of the claims and their equivalents are to be construed as being included in this disclosure.

What is claimed is:

1. A camera module comprising:
   a lens;
   an image sensor disposed on a substrate;
   an adhesive member disposed between the substrate and the image sensor; and
   a support member disposed on the substrate and contacted with the image sensor,
   wherein the support member comprises a bonding wire form, and
   wherein the bonding wire comprises a portion in contact with a lower portion of the image sensor.

2. The camera module of claim 1, wherein the support member is disposed along a lower edge of the image sensor.

3. The camera module of claim 1, wherein the adhesive member is partially disposed in a diagonal direction of the image sensor.

4. The camera module of claim 1, wherein the portion in contact with the lower portion of the image sensor comprises a horizontal portion in line contact with the lower portion of the image sensor.

5. A camera module comprising:
   a lens;
   a substrate comprising a groove;
   an image sensor disposed in the groove;
   an adhesive member fixing the image sensor to the groove; and
   a support member disposed in the groove configured to maintain a constant distance between the lens and the image sensor,
   wherein the support member comprises a bonding wire form.

6. The camera module of claim 5, wherein the adhesive member is disposed between inner surfaces of the groove and side surfaces of the image sensor.

7. The camera module of claim 5, wherein the substrate comprises:
   a first substrate member in which a through-hole corresponding to the groove is formed; and
   a second substrate member coupled to the first substrate member and closing a lower portion of the through-hole.

8. The camera module of claim 5, wherein the bonding wire comprises a horizontal portion in line contact with a lower portion of the image sensor.

9. A camera module, comprising:
   a substrate;
   a support member disposed on the substrate;
   an image sensor disposed on the support member;
   an adhesive member bonded to the substrate and the image sensor, wherein the adhesive member thickness in a direction from the substrate to the image sensor is predetermined by the image sensor disposed against the support member; and
   a lens,
   wherein the support member comprises a plastically deformed portion to align the image sensor and the lens by a predetermined distance.

10. The camera module of claim 9, wherein the support member is spaced apart from the adhesive member.

11. The camera module of claim 9, wherein the image sensor is disposed on a bottom surface of a groove in the substrate, and the adhesive member is further disposed on a side surface of the image sensor between inner surfaces of the groove.

12. The camera module of claim 9, wherein the adhesive member urges the image sensor against the support member.

13. A camera module comprising:
   a lens;
   a substrate comprising a groove;
   an image sensor disposed in the groove;
   an adhesive member fixing the image sensor to the groove; and
   a support member disposed in the groove and contacted with a bottom of the image sensor,
   wherein the substrate comprises:
   a first substrate member in which a through-hole corresponding to the groove is formed; and
   a second substrate member coupled to the first substrate member and closing a lower portion of the through-hole.

14. The camera module of claim 13, wherein the adhesive member is disposed between inner surfaces of the groove and side surfaces of the image sensor.

15. The camera module of claim 13, wherein the support member is disposed along a lower edge of the image sensor.

16. The camera module of claim 13, wherein the adhesive member is partially disposed in a diagonal direction of the image sensor.

17. The camera module of claim 13, wherein the support member is spaced apart from the adhesive member.

18. The camera module of claim 13, wherein the adhesive member urges the image sensor against the support member.

* * * * *